(No Model.)  J. RUDOLPHS.  2 Sheets—Sheet 1.
LUBRICATOR.

No. 282,781.  Patented Aug. 7, 1883.

Witnesses
William S. Poulter
Geo. W. Knott

Inventor
John Rudolphs
per Henry Otto
att'y (No Model.) 2 Sheets—Sheet 2.
J. RUDOLPHS.
LUBRICATOR.
No. 282,781. Patented Aug. 7, 1883.
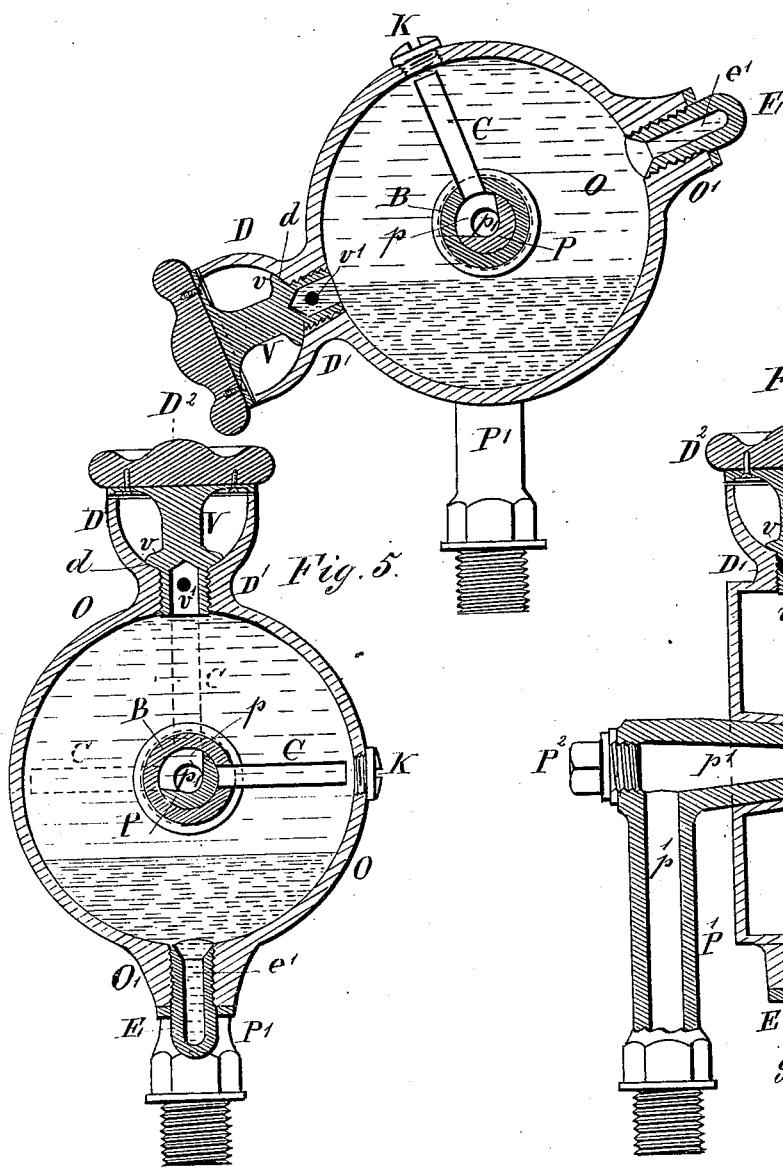
Witnesses
William S. Boulter
Geo. W. Kriotts
Inventor
John Rudolphs
p. Henry Orth
att'y

UNITED STATES PATENT OFFICE.

JOHN RUDOLPHS, OF STOCKHOLM, SWEDEN.

LUBRICATOR.

SPECIFICATION forming part of Letters Patent No. 282,781, dated August 7, 1883.

Application filed February 8, 1883. (No model.)

*To all whom it may concern:*

Be it known that I, JOHN RUDOLPHS, a subject of the King of Sweden, residing in Stockholm, Sweden, have invented certain new and useful Improvements in Condensing-Lubricators; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in lubricators, and has for its object to provide means for supplying the lubricant to the cylinder in uniform quantities, not exceeding that required for the perfect lubrication of the parts, thereby preventing the waste of oil, and at the same time keeping the parts lubricated in perfect working condition.

The further object of my invention is to provide means whereby the quantity of oil fed to the cylinder may be adjusted with great nicety; and, lastly, my invention has for its object to so construct the lubricator as to require, when once adjusted, but little care and attention, it being automatic in its operation.

Figure 3:
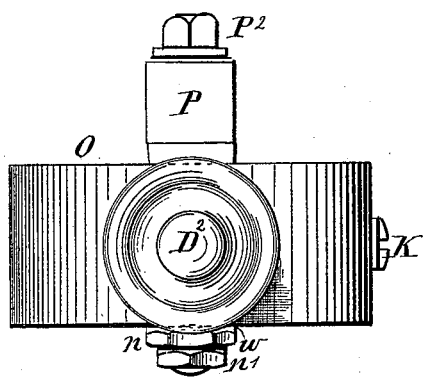
Figure 1:
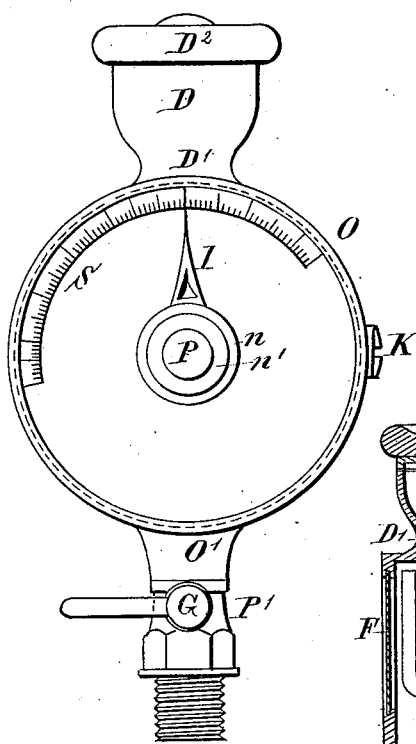
Figure 7:
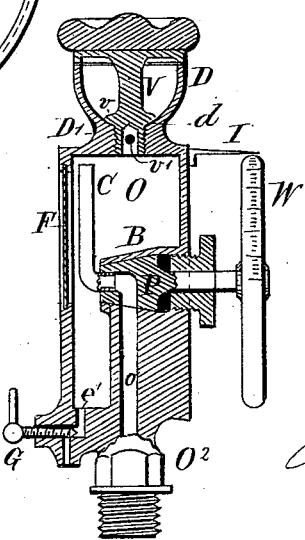
Figure 2:
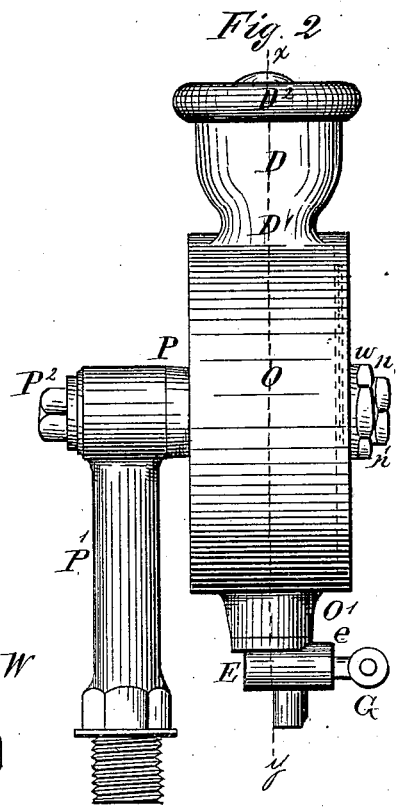

In the accompanying drawings, Figure 1 is a front elevation, Fig. 2 a side elevation, and Fig. 3 a plan view, of my improved lubricator. Figs. 4 and 5 are sections taken on lines $x\ x$ and $y\ y$ of Figs. 1 and 2, respectively. Fig. 6 is a similar view to that shown in Fig. 5, illustrating the manner of adjusting the lubricator. Fig. 7 is a sectional view, showing a slight modification in the construction of the same.

Like letters of reference indicate like parts wherever such may occur in the above figures of drawings.

Although the lubricator is more especially designed for application to the distributing-pipe of the slide-valve box or to the said box or the cylinder of the steam-engine, from the description thereof hereinafter it will be readily seen that it may be applied to any other part or parts of a machine by providing means for supplying steam to the oil-reservoir.

The lubricator consists of a casing preferably cylindrical, though it may be made spherical or of other suitable shape, said casing constituting the oil-reservoir O. The reservoir O has a conical tubular axis that constitutes the barrel B for the plug P. A pipe, C, is connected to the barrel B, and extends radially therefrom, with its outer end, $c$, in proximity to the interior wall of the oil-reservoir, as shown in Figs. 5 and 6. The pipe C is open at both ends, whereby the reservoir is placed in communication with the way or passage $p'$ of the plug P.

K is a screw-plug screwed into the periphery of the reservoir, by means of which access may be had to the distributing or feed pipe C for cleaning the same.

The oil-reservoir O is rotatably secured upon the plug P, as is usual in stop-cocks, by means of a washer, $w$, and a nut, $n$, and check-nut $n'$, Figs. 1 and 4. In practice I prefer to provide the reservoir with a glass or other transparent or translucent face, F, upon which I form or to which I attach a scale, S, graduated to the volume of oil delivered by the feed-pipe C when said pipe is brought into a certain position; and I combine therewith a hand or index, I, rigidly secured to the plug between the glass face and washer $w$, Figs. 1 and 4, whereby the feed-pipe may be adjusted to the required feed by rotating the reservoir upon its plug. The plug P has a port, $p$, preferably conical in cross-section, Figs. 5 and 6, its greatest diameter being at the periphery of the plug, said diameter being much greater than that of the feed-pipe C. This port $p$ communicates with the passage or way $p'$ of the plug. A vertical tubular arm or standard, P', is formed on or secured to the outer end of the plug P, said arm being screw-threaded at its lower end for screwing it upon the steam-cylinder, or to the distributing-pipe of the slide-box, or to the slide-box itself.

$P^2$ is a screw-plug screwed into the end of plug P, whereby access may be had to the interior thereof for purposes of cleaning the same without necessitating the removal of the oil-reservoir.

The reservoir O is provided with a feed-cup, D, the neck D' of which is screw-threaded interiorly and closed by a screw-valve, V, secured to a knob or hand-wheel, $D^2$, for rotating the same. The cup D' has a valve-seat, $d$, upon which is seated the annular flange v of the valve V, the screw-threaded end of which is provided with ports v'. When the valve v is rotated to partially unscrew the same from the neck of the cup, the ports v' will be uncovered and conduct oil poured into the cup to the reservoir, and when screwed down again into the neck of the cup said ports will be hermetically closed, as will be readily understood. The reservoir O is also provided with a "blow-off" or discharge cock, Figs. 1, 2, and 4, consisting of a plug, E, screwed into a tubular projection, O', formed on the reservoir. The plug E has an interiorly-threaded branch, e, formed at right angles to its way e', in which is fitted the screw-valve G, having a conical point, g. This valve is used for discharging the water condensed from the steam when the oil in the reservoir has been exhausted, and also for blowing out any sediment that may collect in the reservoir. This blow-off cock may also be used as a try-cock, to ascertain the quantity of water collected in the reservoir when the latter is not provided with a glass face. This may be readily effected by turning the reservoir into various positions, opening each time the try-cock, to ascertain whether water or oil escapes therefrom.

In Fig. 7, I have shown a lubricator which but slightly differs in construction from that described, the principle involved being the same. In this construction the barrel B for the plug P does not extend from wall to wall of the oil-reservoir, and the feed-pipe C is connected with the plug, instead of being connected with the barrel. The plug in this case is secured to the reservoir by passing its stem through a suitable stuffing-box that is revolved by a hand-wheel, W, the periphery of which is graduated, so that instead of rotating the reservoir and feed-pipe C on the plug P, as hereinbefore described, and as shown in Figs. 1 to 6, the plug and feed-pipe are rotated within the reservoir, the latter being screwed to the cylinder, or the slide-box, or the distributing-pipe of the latter, as the case may be, the plug P and its pipe C communicating with a passage, o, formed in the reservoir O, and through the latter with the hollow standard or screw-threaded coupling O², that secures it to the part to be lubricated.

The operation of this lubricator may be briefly described as follows: When the oil-reservoir is in the vertical position shown, Figs. 1, 2, 3, 4, and 5, the feed-pipe C will lie horizontally on the right of the port p of the plug P, and the said port will be closed. The reservoir may now be filled with oil through the cup D, as hereinabove described. If the reservoir is then turned to bring the pipe C in a vertical position, (shown in dotted lines, Fig. 5,) the pipe C will deliver a minimum of oil, its mouth standing at the highest level. As the oil is conducted away from the reservoir the steam admitted thereto through the plug and pipe C is condensed, sinks below the oil, an equivalent of water taking the place of the oil consumed, and maintaining the level of the oil within the reservoir constant, so that a uniform quantity of oil passes through the pipe C as long as steam enters into said reservoir. If the quantity of oil thus supplied is insufficient, the reservoir may be rotated more to the left, as shown in Fig. 6, thus bringing the mouth of the pipe C on a lower level, and admitting a greater quantity of oil, which quantity may be gradually increased to the full capacity of the distributing-pipe C by rotating the reservoir until the said pipe is in the horizontal position shown in dotted lines in Fig. 5. In this manner the quantity of oil distributed to the parts to be lubricated may be regulated with the greatest precision, the level thereof maintained constant, as it is evident that the volume of steam condensed will be in proportion to the volume of oil passing through the feed-pipe, since the area of the interior surface of the reservoir exposed to the steam, and upon which it is condensed, will increase in proportion to the volume of oil passing through pipe C.

If it is necessary to supply oil to the part lubricated before steam is or can be admitted to the oil-reservoir, it will only be necessary to revolve the reservoir sufficiently to the left to immerse the feed-pipe in and fill it with oil and then turn it back to bring said pipe into communication with the plug, and repeating this operation any required number of times, whereby a corresponding volume of oil may be fed to the said part or parts.

By means of the glass face F the quantity of oil in the reservoir may be ascertained at any time, and by means of its index and scale it may be readily adjusted to the required feed.

Of course it will be understood that if it is desired to apply the lubricator to other parts of machinery—such, for instance, as axle-boxes, &c., when steam cannot be obtained directly—such may be supplied to the reservoir by suitable steam connection either with the plug P, or by making such connection directly with the reservoir.

When once filled the lubricator needs no further attention until the oil is exhausted, and there is practically, in fact I may say absolutely, no waste of oil.

Having thus described my invention, what I claim, and desire to secure by Letters Patent of the United States, is—

1. A lubricator consisting of an oil-reservoir having a tubular barrel, a steam-admission and lubricant-delivery tube rigidly connected therewith, and a stationary plug upon which said reservoir is rotatably mounted, and through which steam is fed to and the lubricant taken from the said reservoir, substantially as described, for the purposes specified.

2. In a lubricator, an oil-reservoir provided with an index or scale, a tubular axis, B, and a tube, C, connected therewith, in combination with a stationary plug, P P', and a fixed index or hand connected therewith, substantially as and for the purposes specified.

3. In a lubricator, an oil-reservoir having a tubular bearing, a port or passage, such as shown and described, for admitting steam to and taking the lubricant from said reservoir through the tubular bearing, in combination with the tube C, arranged relatively to the reservoir, and the steam-admission and lubricant exhaust port or passage, substantially as described, for the purposes set forth.

4. The lubricator composed of the oil-reservoir O, having the tubular conical axis B, the pipe C, attached thereto, the feed-cup D, and the valve V, the blow-off or try-cock E G, and the plug P, all constructed and arranged for co-operation, substantially as and for the purposes specified.

In witness whereof I have hereunto signed my name in the presence of two subscribing witnesses.

JOHN RUDOLPHS.

Witnesses:
NERE A. ELFWING,
E. H. BRUHN.